US011432195B1

(12) United States Patent
Marupaduga (10) Patent No.: US 11,432,195 B1
(45) Date of Patent: Aug. 30, 2022

(54) LOAD BALANCING BASED ON PAIRING EFFICIENCY AND CHANNEL BANDWIDTH

(71) Applicant: Sprint Spectrum LP, Overland Park, KS (US)

(72) Inventor: Sreekar Marupaduga, Overland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 111 days.

(21) Appl. No.: 16/832,743

(22) Filed: Mar. 27, 2020

(51) Int. Cl.
*H04B 7/0452* (2017.01)
*H04W 28/08* (2009.01)
*H04W 36/22* (2009.01)

(52) U.S. Cl.
CPC .......... *H04W 28/08* (2013.01); *H04B 7/0452* (2013.01); *H04W 36/22* (2013.01)

(58) Field of Classification Search
CPC ..... H04W 28/08; H04W 36/22; H04B 7/0452
See application file for complete search history.

(56) References Cited

U.S. PATENT DOCUMENTS

| | | | | |
|---|---|---|---|---|
| 8,139,519 B2* | 3/2012 | Ahn | ...................... | H04W 52/42 370/318 |
| 9,420,484 B2* | 8/2016 | Feng | ...................... | H04W 24/10 |
| 9,876,585 B2* | 1/2018 | Gage | ...................... | H04B 7/024 |
| 10,063,292 B2* | 8/2018 | Hirsch | ................ | H04B 7/0871 |
| 10,070,454 B2* | 9/2018 | Elsherif | ............... | H04B 7/0689 |
| 10,659,115 B1* | 5/2020 | Marupaduga | .......... | H04B 17/11 |
| 10,880,224 B1* | 12/2020 | Pawar | ................... | H04W 24/02 |
| 11,051,220 B1* | 6/2021 | Song | ..................... | H04W 8/245 |
| 11,116,031 B2* | 9/2021 | Mildh | .................... | H04W 76/19 |
| 2016/0381707 A1* | 12/2016 | Figueiredo | ........ | H04W 74/0808 370/350 |
| 2017/0063437 A1* | 3/2017 | Elsherif | ............... | H04B 7/0452 |
| 2018/0054749 A1* | 2/2018 | Kim | ................ | H04W 36/00837 |
| 2018/0092102 A1* | 3/2018 | Pefkianakis | ......... | H04B 7/0452 |
| 2018/0124694 A1* | 5/2018 | Pefkianakis | .......... | H04W 48/20 |
| 2019/0029003 A1* | 1/2019 | Takeda | ................ | H04W 56/001 |
| 2019/0103954 A1* | 4/2019 | Lee | ...................... | H04W 72/042 |
| 2019/0104554 A1* | 4/2019 | Amuru | ................ | H04W 72/042 |
| 2019/0260459 A1* | 8/2019 | Jeon | ..................... | H04B 7/0473 |
| 2019/0281487 A1* | 9/2019 | Liu | ....................... | H04L 5/0057 |
| 2019/0297538 A1* | 9/2019 | Keller | ............... | H04W 36/0022 |
| 2019/0306764 A1* | 10/2019 | da Silva | ................ | H04W 36/04 |
| 2019/0319868 A1* | 10/2019 | Svennebring | ......... | H04L 41/147 |
| 2020/0007199 A1* | 1/2020 | Wang | ................... | H04B 7/0452 |
| 2020/0008054 A1* | 1/2020 | Wifvesson | ............ | H04W 36/14 |
| 2020/0015148 A1* | 1/2020 | Zhou | ..................... | H04W 72/10 |
| 2020/0045707 A1* | 2/2020 | Hwang | ................. | H04L 5/0053 |
| 2020/0045708 A1* | 2/2020 | Hwang | ............... | H04W 72/042 |
| 2020/0053811 A1* | 2/2020 | Ang | ..................... | H04W 28/20 |

(Continued)

*Primary Examiner* — Parth Patel (57) ABSTRACT

Load balancing based on pairing efficiency and channel bandwidth includes comparing pairing efficiency metrics of wireless devices attached to different wireless air interfaces, comparing an aggregate channel bandwidth of carriers using each wireless air interface, and offloading wireless devices from one carrier to another carrier based on the comparisons of the pairing efficiency metrics and the aggregate channel bandwidth. In an embodiment, wireless devices are offloaded from a 5G NR wireless air interface to a 4G LTE wireless air interface having a higher pairing efficiency and aggregate channel bandwidth.

15 Claims, 5 Drawing Sheets

(56) References Cited

U.S. PATENT DOCUMENTS

| | | | |
|---|---|---|---|
| 2020/0084818 A1* | 3/2020 | Xu | H04W 36/0079 |
| 2020/0154388 A1* | 5/2020 | Koshimizu | H04W 68/005 |
| 2020/0235896 A1* | 7/2020 | Lee | H04W 74/0833 |
| 2020/0244429 A1* | 7/2020 | Bao | H04W 36/08 |
| 2020/0245369 A1* | 7/2020 | Chen | H04W 48/16 |
| 2020/0266950 A1* | 8/2020 | Hwang | H04W 72/005 |
| 2020/0275313 A1* | 8/2020 | He | H04W 28/0284 |
| 2020/0343945 A1* | 10/2020 | Stephenne | H04B 7/0452 |
| 2020/0344761 A1* | 10/2020 | Amuru | H04B 7/0452 |
| 2020/0351754 A1* | 11/2020 | Kim | H04W 48/12 |
| 2020/0403761 A1* | 12/2020 | Nguyen | H04L 5/001 |
| 2021/0037421 A1* | 2/2021 | Allan | H04W 28/0958 |
| 2021/0058846 A1* | 2/2021 | Dong | H04W 36/00837 |
| 2021/0143887 A1* | 5/2021 | Oteri | H04B 7/0452 |
| 2021/0144062 A1* | 5/2021 | Jin | H04W 48/18 |
| 2021/0159966 A1* | 5/2021 | Xi | H04L 5/0053 |
| 2021/0185571 A1* | 6/2021 | Ly | H04W 36/0069 |
| 2021/0211944 A1* | 7/2021 | Eklof | H04W 36/0058 |
| 2021/0227403 A1* | 7/2021 | Tsui | H04W 24/02 |
| 2021/0258977 A1* | 8/2021 | Stephenne | H04B 7/0452 |
| 2021/0266753 A1* | 8/2021 | Kumar | H04W 28/0252 |

* cited by examiner

LOAD BALANCING BASED ON PAIRING EFFICIENCY AND CHANNEL BANDWIDTH

TECHNICAL BACKGROUND

As wireless networks evolve and grow, there are ongoing challenges in providing high-quality service to increasing numbers of wireless devices in various coverage areas of a wireless network. Different wireless devices are configured to use different types of applications (such as voice over IP, streaming, gaming, etc.), and each different application may optimally function with a different channel size or bandwidth. Further, radio access technologies (RATs) such as 5G New Radio (NR) are being implemented alongside existing RATs such as 3G and 4G Long Term Evolution (LTE), and wireless devices are increasingly becoming more capable of connecting to these RATs. While channel bandwidths in 4G are static, 5G is capable of deploying various different bandwidths, most of which are higher than 4G bandwidths. Further, "Dual Connectivity" refers to the ability for wireless devices to attach to two or more access nodes and transmit/receive information via two wireless connections simultaneously. In exemplary situations, dual connectivity can include E-UTRAN-NR Dual Connectivity (EN-DC), which uses both 4G and 5G RATs. For example, a wireless device capable of dual connectivity can attach to both 4G and 5G RATs, using the 4G RAT for control transmissions, while using the 5G RAT for data transmissions. Using the 5G RAT for data transmissions is advantageous, as 5G provides higher bandwidths and frequencies versus 4G. In addition, while different carriers offer different channel bandwidths, certain combinations of carriers may provide a greater aggregate channel bandwidth. For example, numerous 4G carriers each of which is configured to provide a 20 MHz channel bandwidth may provide an aggregate channel bandwidth that is greater than a 50 MHZ or 60 MHz channel bandwidth provided by a 5G carrier.

Further, wireless networks may be configured to utilize multiple-input-multiple-output (MIMO), in which multiple data streams can be directed towards one or more eligible wireless devices via various combinations of antennae and transceivers based on the orthogonality of transmission, thereby maximizing resources. MIMO can include single-user MIMO (SU-MIMO), multi-user MIMO (MU-MIMO), and massive MIMO (mMIMO), which extends MU-MIMO to antenna arrays coupled to base stations, the antenna arrays comprising large numbers of controllable antenna elements that enable directing several MU-MIMO streams to various groups or "pairings" of wireless devices. MIMO has been identified as one of the promising air interface technologies to address the capacity requirement required demanded by 5G networks. However, MIMO has also been used to improve network capacity and throughput in legacy 4G networks. Thus, wireless devices that satisfy certain requirements (i.e. pairing criteria) can be configured to receive MU-MIMO streams using the same air-interface resources.

However, there are considerations regarding how to optimally communicate between an access node comprising a plurality of antenna elements utilizing different bandwidths or RATs, and wireless devices with different capabilities and requirements. For example, as increasing amounts of data are being transmitted to wireless devices (e.g. multimedia content, live streams, etc.), resources such as physical resource blocks in channels may become scarce. While MIMO increases efficiency of existing air-interface resources such as physical resource blocks (due to, for example, orthogonality of transmission), wireless devices that do not use or otherwise qualify for MIMO transmissions may use excessive amounts of resources. Further, when a particular carrier (e.g. a 4G carrier or a 5G carrier) is heavily loaded, it becomes more imperative to use MIMO to increase efficiency.

OVERVIEW

Exemplary embodiments described herein include methods, systems, and processing nodes for load balancing based on pairing efficiency and channel bandwidth. An exemplary method for load balancing based on pairing efficiency and channel bandwidth includes determining that a first pairing efficiency metric of a first wireless air interface deployed over a wireless sector is higher than a second pairing efficiency metric of a second wireless air interface deployed over the wireless sector, determining that a first channel bandwidth associated with the first wireless air interface is higher than or equal to a second channel bandwidth associated with the second wireless air interface, and offloading wireless devices from the second wireless air interface to the first wireless air interface.

An exemplary system for load balancing based on pairing efficiency and channel bandwidth includes an access node configured to deploy at least two carriers, and a processing node coupled to the access node, the processing node being configured to perform operations including comparing pairing efficiency metrics of wireless devices attached to each of the first and second wireless air interfaces, comparing an aggregate channel bandwidth of each of the first one or more carriers and the second one or more carriers, and based on the comparisons of the pairing efficiency metrics and the aggregate channel bandwidth, offloading wireless devices from one carrier to another carrier.

An exemplary processing node for load balancing based on pairing efficiency and channel bandwidth is configured to perform operations including determining that a first channel bandwidth associated with a first wireless air interface is higher than or equal to a second channel bandwidth associated with a second wireless air interface, wherein both first and second wireless air interfaces are deployed by an access node, and offloading wireless devices from the second wireless air interface to the first wireless air interface.

DETAILED DESCRIPTION

The following disclosure presents methods and systems for triggering handovers of wireless devices across different wireless air interfaces based on a combination of a MIMO pairing efficiency metric associated with each different wireless air interface and an aggregate channel bandwidth of carriers utilizing each different wireless air interface. The operations described herein may be performed by processing nodes and/or access nodes configured to communicate over a plurality of channel sizes and/or RATs. For example, the access node can include a combination of a 4G eNodeB and a 5G gNodeB. In other words, the access node can comprise transceivers that are configured to communicate using 4G LTE as well as transceivers that are configured to communicate using 5G NR. Further, the access node can include a plurality of antennae (or antenna elements), a portion of which is configured to deploy a first bandwidth or RAT (e.g. 4G LTE), and a portion of which is configured to deploy a second bandwidth or RAT (e.g. 5G NR). In addition, in 5G EN-DC systems, control transmissions continue to utilize the non-dedicated 4G antenna elements, reserving the 5G antenna elements for data communication (i.e. payloads, etc.) with the wireless devices meeting the criteria. Generally, 5G NR utilizes larger channel bandwidths and frequencies than 4G LTE; however, combinations of different 4G LTE carriers may provide a larger aggregate channel bandwidth that a 5G NR carrier.

Thus, operations described herein can include determining that a first pairing efficiency metric of a first wireless air interface deployed over a wireless sector is higher than a second pairing efficiency metric of a second wireless air interface deployed over the wireless sector, determining that a first channel bandwidth associated with the first wireless air interface is higher than or equal to a second channel bandwidth associated with the second wireless air interface, and offloading wireless devices from the second wireless air interface to the first wireless air interface. Offloading wireless devices from the second wireless air interface to the first wireless air interface can include triggering handovers of the wireless devices from the second wireless air interface to the first wireless air interface. For example, triggering handovers can include adjusting handover thresholds associated carriers using each of the first and second wireless air interfaces. Alternatively or in addition, the operations can include comparing pairing efficiency metrics of wireless devices attached to each of the first and second wireless air interfaces, comparing an aggregate channel bandwidth of each of the first one or more carriers and the second one or more carriers, and based on the comparisons of the pairing efficiency metrics and the aggregate channel bandwidth, offloading wireless devices from one carrier to another carrier.

The pairing efficiency metrics can be based on an eligibility of wireless devices in each of the first or second one or more carriers to join or form MU-MIMO groups. In an exemplary embodiment, the pairing efficiency metric comprises a percentage quantity of wireless devices that are eligible to join or form the MU-MIMO groups. Alternatively or in addition, the pairing efficiency may be based on a ratio of a number of wireless devices qualifying for MIMO versus a total number of wireless devices attached to the access node, and can include current, historical, or predicted trends. In particular, for access nodes capable of deploying different wireless air interfaces (e.g. 4G LTE and 5G NR), the pairing efficiency is determined for each carrier using each wireless air interface. If the pairing efficiency for carriers in one wireless air interface is higher than for carriers using another wireless air interface (based on, for instance, the number of wireless devices qualifying for MU-MIMO pairing in each wireless air interface, or other metrics as identified below), then load balancing is performed between the carriers of each wireless air interface. In particular, handovers are triggered of wireless devices from a wireless air interface having a low pairing efficiency to a wireless air interface having a high pairing efficiency.

Further, an aggregate channel bandwidth for each wireless air interface is considered. For example, upon determining that a first pairing efficiency metric of wireless devices attached to the first wireless air interface is higher than or equal to a second pairing efficiency metric of wireless devices attached to the second wireless air interface, and also upon determining that a first aggregate bandwidth of the first one or more carriers is greater than or equal to a second aggregate bandwidth of the second one or more carriers, wireless devices are offloaded from the second wireless air interface to the first wireless air interface. Whereas, upon determining that a first pairing efficiency metric of wireless devices attached to the first wireless air interface is higher than a second pairing efficiency metric of wireless devices attached to the second wireless air interface, and upon determining that a first aggregate bandwidth of the first one or more carriers is lower than a second aggregate bandwidth of the second one or more carriers, wireless devices are not offloaded from the second wireless air interface to the first wireless air interface, because the aggregate channel bandwidth is lower despite the pairing efficiency being higher. Similarly, upon determining that a first pairing efficiency metric of wireless devices attached to the first wireless air interface is lower than a second pairing efficiency metric of wireless devices attached to the second wireless air interface, and upon determining that a first aggregate bandwidth of the first one or more carriers is lower than a second aggregate bandwidth of the second one or more carriers, wireless devices may be offloaded from the first wireless air interface to the second wireless air interface.

Consequently, resources consumption of the wireless air interface having the low pairing efficiency is mitigated, and wireless devices are able to exploit the higher channel bandwidths provided by the wireless air interface that also has the higher pairing efficiency. These and other embodiments are further described herein and with reference to FIGS. 1-7 below.

Figure 1:
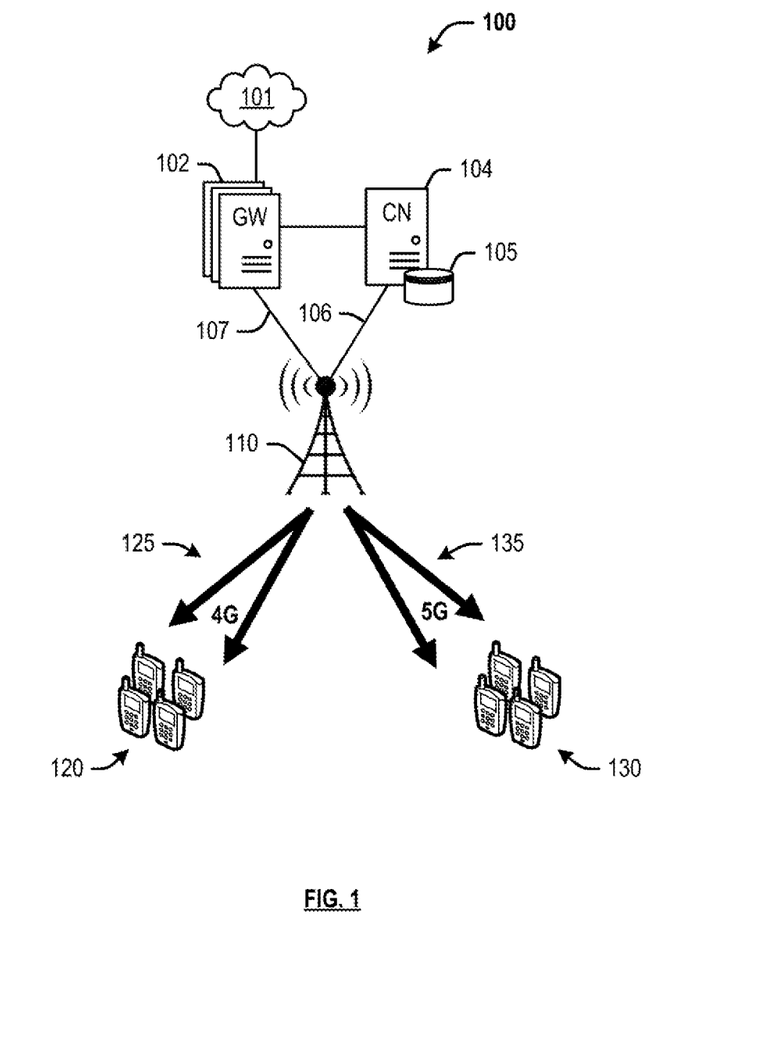
FIG. 1 depicts an exemplary system for load balancing based on pairing efficiency and channel bandwidth.

FIG. 1 depicts an exemplary system 100 comprising a communication network 101, gateway 102, controller node 104, access node 110, and wireless devices 120 and 130. In this exemplary embodiment, access node 110 may be configured to deploy carriers using at least two wireless air interfaces, such as a 4G LTE wireless air interface, and a 5G NR wireless air interface. Each wireless air interface may be configured to utilize a different frequency band or sub-band, and carriers deployed therefrom can be configured to utilize a different channel size or channel bandwidth. For example, a 5G NR carrier may be configured to utilize higher frequencies and larger channel bandwidths than a 4G LTE carrier. Further, access node 110 can be configured to deploy any number of carriers using each wireless air interface. Thus, the 4G LTE wireless air interface can include multiple carriers, thereby providing a larger aggregate channel bandwidth than a carrier using the 5G NR wireless air interface. As illustrated herein, access node 110 can comprise antennae that are configured to communicate with wireless devices 120 via the 4G wireless air interface, and with wireless devices 130 via the 5G wireless air interface. In an exemplary embodiment, access node 110 is configured to utilize 5G EN-DC, dual connections are initiated with wireless devices 130 using both 4G and 5G wireless air interfaces (or carriers deployed therein), with a 4G carrier being used to transmit control information, and a 5G carrier being used to transmit data information. For example, a processing node within system 100 (for example, communicatively coupled to access node 110, controller node 104, or any other network node) can be configured to determine whether or not wireless devices 120, 130 are capable of communicating using both wireless air interfaces, and instruct the access node 110 to broadcast an indicator in, for example, a system information message. For example, access node 110 may use a 4G carrier to control and set up a dual connectivity session with wireless devices 130. In other words, control information (including SIB messages) is transmitted from the access node 110 using the 4G carrier, while the 5G carrier is utilized for transmission of data.

Further, as shown herein, wireless devices 120 are illustrated as receiving a MU-MIMO data stream 125 using the 4G wireless air interface, and wireless devices 130 are illustrated as receiving a MU-MIMO data stream 135 using the 5G wireless air interface. Access node 110 (and/or a processing node communicatively coupled thereto) may be configured to perform operations including comparing pairing efficiency metrics and aggregate channel bandwidths of each of the 4G LTE and 5G NR wireless air interfaces, and based on the comparison, offloading wireless devices between carriers using each wireless air interface. For example, upon determining that a pairing efficiency metric of the 4G first wireless air interface is higher than a pairing efficiency metric of the 5G wireless air interface, and further upon determining that a channel bandwidth associated with the 4G wireless air interface is higher than or equal to a channel bandwidth associated with the 5G wireless air interface, wireless devices (such as wireless devices 130) may be offloaded from the 5G wireless air interface to the 4G wireless air interface.

Further, the pairing efficiency metric may be based on any combination of an orthogonality associated with each of wireless devices 120, 130 an angular separation required for MIMO pairing for each of wireless devices 120, 130, a threshold data buffer requirement of a buffer on access node 110, or a number of wireless devices from among each of wireless devices 120, 130 that is eligible to join a MU-MIMO group. For example, being eligible for MU-MIMO (or "qualifying" for MU-MIMO) may be based on, for instance, an orthogonality of transmission (in other words, angular separation), so as to maximize resources of a loaded access node, as well as a total number of wireless devices allowed per MIMO group, or a size of a buffer on access node 110. One or more criteria for wireless devices to qualify for MIMO (or adding wireless devices into an existing MIMO group) include a channel orthogonality (i.e., non-overlapping and non-interfering channels) above a set threshold, which may be achieved by assigning cyclic shifts allocated to, for example, a Demodulation Reference Signal ("DM-RS") to differentiate parallel data streams, as well as having a SINR above a threshold. Qualifying wireless devices may have an assigned precoder that is orthogonal to other qualifying wireless devices. In an exemplary embodiment, downlink transmission schemes of access node 110 (and/or other access nodes not shown herein) may be supported at a physical layer by a set of downlink reference signals. These reference signals can be specific to wireless devices 120, 130, i.e., DM-RS, or specific to geographical areas of access node 110, i.e., Common Reference Signals ("CRS"). DM-RS' are pre-coded signals used for demodulation purposes on scheduled PRBs. For example, a pre-coding module of access node 110 may apply pre-coding to data transmissions targeted to wireless devices 120, 130 based on channel feedback received from said wireless devices including RI, CQI, and PMI. CRS' are not pre-coded signals and are used by wireless devices 120, 130 for channel estimation. To fully exploit MU-MIMO mode, data/spatial streams intended to/from access node 110 and/or wireless devices 120, 130 need to be well separated and orthogonal at both Tx/Rx sides. Optimal pre-coding for MU-MIMO mode at, for example, a pre-coding module of access node 110, may include Dirty Paper Coding ("DPC") combined with user scheduling and power loading. Additional pre-coding techniques may include Channel Inversion ("CI"), e.g., to cancel interference, and/or Regularized Channel Inversion ("RCI"), e.g., to attenuate interference.

As shown in FIG. 1, wireless devices 120 appear to be eligible for and participating in a MIMO stream 125 using a 4G carrier, and wireless devices 130 appear to be eligible for and participating in a MIMO stream 135 using a 5G carrier. The pairing efficiency metric for each carrier can be based on performance of MIMO streams 125, 135, or any other criteria associated with each of wireless devices 120, 130. For example, the pairing efficiency metric can be based on one or more of a size of each MIMO group comprising the eligible wireless devices 120, 130, a quantity of eligible wireless devices participating in the MIMO groups, a percentage of total wireless devices attached to the access node 110 (including but not limited to wireless devices 120, 130), a throughput of each of the one or more MIMO groups in the sector, an average throughput of each MIMO group or each wireless device in each MIMO group, or an aggregate throughput (i.e. total throughput) of all MIMO signals within the sector (including but not limited to MIMO signals 125, 135). Performance metrics and/or pairing efficiency can further be based on historical and/or current information related to a quantity of successful pairings, trends of the signal characteristics, and so on. For example, the historical trends may be monitored and recorded at time intervals, and the pairing efficiency based on the recorded historical trends. Thus, at certain time intervals, the pairing efficiency is monitored when adjusting the MIMO criteria as described herein. Generally, the pairing efficiency tracks how successfully and efficiently the MIMO groups are utilizing the available resources. In an exemplary embodiment, the pairing efficiency metric is based on a ratio of a number of wireless devices qualifying for MU-MIMO versus a total number of wireless devices attached to the access node. In other words, the pairing efficiency metric is based on a percentage quantity of wireless devices in each carrier that are eligible to join or form the MU-MIMO groups.

Thus, upon determining that a pairing efficiency metric of the 4G first wireless air interface is higher than a pairing efficiency metric of the 5G wireless air interface, and further upon determining that a channel bandwidth associated with the 4G wireless air interface is higher than or equal to a channel bandwidth associated with the 5G wireless air interface, wireless devices (such as wireless devices 130) may be offloaded from the 5G wireless air interface to the 4G wireless air interface. The resulting reduction in wireless devices in the 5G carrier frees up air interface resources (such as physical resource blocks) that would otherwise be used by wireless devices that were unable to participate in MIMO. Whereas, the increase in wireless devices in the 4G carrier would not negatively impact the amount of resources in the 4G wireless air interface, because more wireless devices are able to use the same physical resource blocks (due to orthogonality), based on the higher pairing efficiency. Further, the wireless devices attached to the 4G carrier(s) can avail of the higher aggregate channel bandwidth. Further in exemplary embodiments, when the wireless devices are attached to both carriers using dual connectivity, the handover may be seamless, and wireless devices can simply detach from the 5G carrier and begin receiving data transmissions via the 4G carrier.

Access node 110 can be any network node configured to provide communication between wireless devices 120, 130 and communication network 101, including standard access nodes such as a macro-cell access node, base transceiver station, a radio base station, an eNodeB device, an enhanced eNodeB device, an a next generation or gigabit NodeB device (gNodeB) in 5G networks, or the like. In an exemplary embodiment, a macro-cell access node can have a coverage area in the range of approximately five kilometers to thirty-five kilometers and an output power in the tens of watts. Alternatively, access node 110 may comprise any short range, low power, small-cell access nodes such as a microcell access node, a picocell access node, a femtocell access node, or a home eNodeB/gNodeB device.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication links 106, 107. Access node 110 may communicate with each other, and other access nodes (not shown), using a wireless link or a wired link such as an X2 link. Components of exemplary access node 110 and processing nodes coupled thereto are further described with reference to FIGS. 2-3.

Wireless devices 120, 130 may be any device, system, combination of devices, or other such communication platform capable of communicating wirelessly with access node 110 using one or more frequency bands deployed therefrom. Each of wireless devices 120, 130 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 120-140. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communication links 106, 107 may include S1 communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to components of system 100, such as load information of access node 110 and carriers deployed therefrom, pairing efficiency metrics of each carrier, capabilities and pairing eligibility of wireless devices 120, 130, and so on. This information may be requested by or shared with access node 110 via communication links 106, 107, X2 connections, and so on. The software comprises computer programs, firmware, or some other form of machine-readable instructions, and may include an operating system, utilities, drivers, network interfaces, applications, or some other type of software, and combinations thereof. For example, a processing node within controller node 104 can perform the operations described herein. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Further, the methods, systems, devices, networks, access nodes, and equipment described herein may be implemented with, contain, or be executed by one or more computer systems and/or processing nodes. The methods described above may also be stored on a non-transitory computer readable medium. Many of the elements of communication systems 100 may be, comprise, or include computers systems and/or processing nodes. This includes, but is not limited to: access node 110, controller node 104, and/or networks 101, 201.

Figure 2:
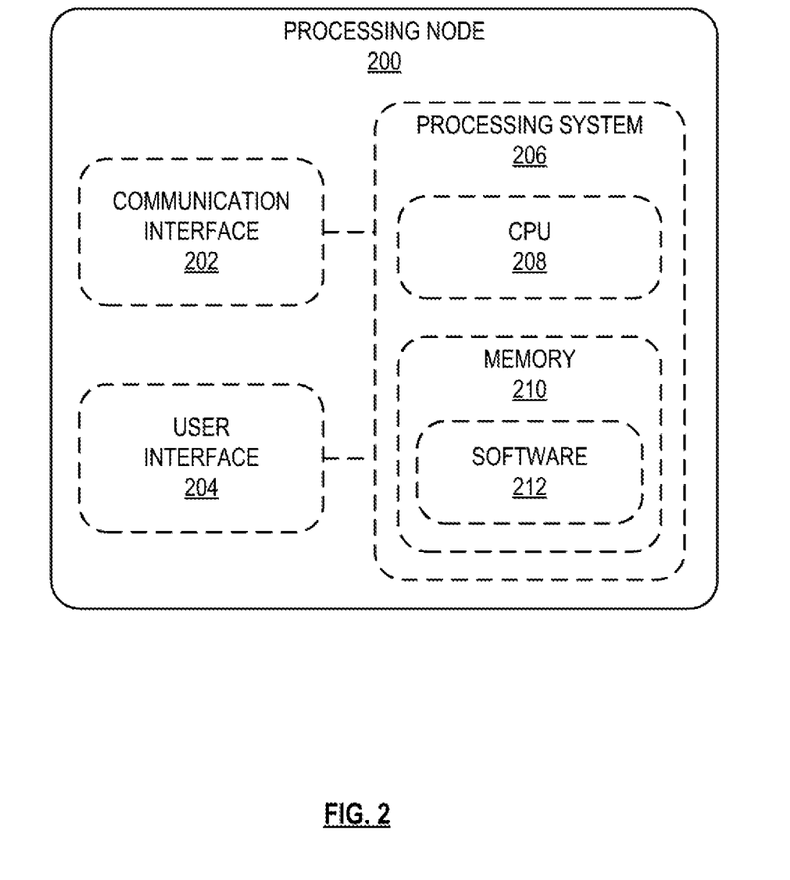
FIG. 2 depicts an exemplary processing node for load balancing based on pairing efficiency and channel bandwidth.

FIG. 2 depicts an exemplary processing node 200. Processing node 200 comprises a communication interface 202, user interface 204, and processing system 206 in communication with communication interface 202 and user interface 204. Processing system 206 includes a central processing unit (CPU) 208, and a memory 210, which can comprise a disk drive, flash drive, memory circuitry, or other memory device. Memory 210 can store computer programs, firmware, or some other form of machine-readable instructions, including an operating system, utilities, drivers, network interfaces, applications, or some other type of software. Further, memory 210 can store a software 212, which may be executed to perform the operations described herein. Processing system 206 may include other circuitry to retrieve and execute software 212 from memory 210. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

In an exemplary embodiment, software 212 can include instructions for determining that a first pairing efficiency metric of a first wireless air interface deployed over a wireless sector is higher than a second pairing efficiency metric of a second wireless air interface deployed over the wireless sector, determining that a first channel bandwidth associated with the first wireless air interface is higher than or equal to a second channel bandwidth associated with the second wireless air interface, and offloading wireless devices from the second wireless air interface to the first wireless air interface. Offloading wireless devices from the second wireless air interface to the first wireless air interface comprises triggering handovers of the wireless devices from the second wireless air interface to the first wireless air interface. Triggering handovers comprises adjusting handover thresholds associated carriers using each of the first and second wireless air interfaces. Further, the first and second wireless air interfaces are deployed by a colocated access node. For example, the first wireless air interface comprises a $4^{th}$ generation long-term evolution (4G-LTE) wireless air interface and the second wireless air interface comprises a $5^{th}$ generation new radio (5G-NR) wireless air interface. Thus, in an exemplary embodiment, the first channel bandwidth comprises an aggregate channel bandwidth of two or more carriers configured to utilize the 4G-LTE wireless air interface. Both first and second channel bandwidths can be aggregate, in that the second channel bandwidth also comprises an aggregate channel bandwidth of two or more carriers configured to utilize the 5G-NR wireless air interface. Further, each pairing efficiency metric is respectively based on an eligibility of wireless devices to join or form MU-MIMO groups in each wireless air interface respectively. For example, the eligibility is based on one or more criteria including any combination of: an orthogonality of wireless devices, an angular separation of wireless devices, or a threshold data buffer requirement. In an exemplary embodiment, each pairing efficiency metric comprises a percentage quantity of wireless devices that are eligible to join or form the MU-MIMO groups.

In another exemplary embodiment, software 212 can include instructions for comparing pairing efficiency metrics of wireless devices attached to each of the first and second wireless air interfaces, comparing an aggregate channel bandwidth of each of the first one or more carriers and the second one or more carriers, and based on the comparisons of the pairing efficiency metrics and the aggregate channel bandwidth, offloading wireless devices from one carrier to another carrier. The pairing efficiency metrics are based on an eligibility of wireless devices in each of the first or second one or more carriers to join or form MU-MIMO groups. Further, software 212 can include instructions for determining that a first pairing efficiency metric of wireless devices attached to the first wireless air interface is higher than or equal to a second pairing efficiency metric of wireless devices attached to the second wireless air interface, determining that a first aggregate bandwidth of the first one or more carriers is greater than or equal to a second aggregate bandwidth of the second one or more carriers, and offloading wireless devices from the second wireless air interface to the first wireless air interface. Alternatively or on addition, software 212 can include instructions for determining that a first pairing efficiency metric of wireless devices attached to the first wireless air interface is higher than a second pairing efficiency metric of wireless devices attached to the second wireless air interface, determining that a first aggregate bandwidth of the first one or more carriers is lower than a second aggregate bandwidth of the second one or more carriers, and avoiding offloading wireless devices from the second wireless air interface to the first wireless air interface. Alternatively or on addition, software 212 can include instructions for determining that a first pairing efficiency metric of wireless devices attached to the first wireless air interface is lower than a second pairing efficiency metric of wireless devices attached to the second wireless air interface, determining that a first aggregate bandwidth of the first one or more carriers is lower than a second aggregate bandwidth of the second one or more carriers, and avoiding offloading wireless devices from the first wireless air interface to the second wireless air interface.

Figure 3:
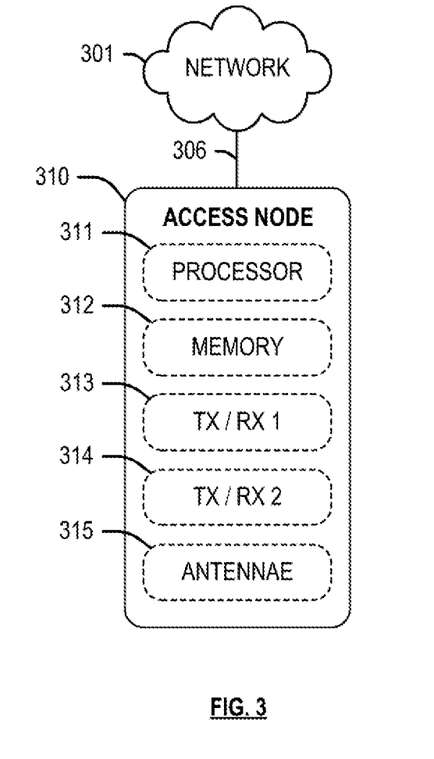
FIG. 3 depicts an exemplary access node for load balancing based on pairing efficiency and channel bandwidth.

FIG. 3 depicts an exemplary access node 310. Access node 310 may comprise, for example, a macro-cell access node, such as access node 110 described with reference to FIG. 1. Access node 310 is illustrated as comprising a processor 311, memory 312, first transceiver 313, second transceiver 314, and antennae 315. Processor 311 executes instructions stored on memory 312, and transceivers 313 and 314 (in conjunction with antennae 315) enable wireless communication respectively using a first wireless air interface (e.g. 4G LTE) and a second wireless air interface (e.g. 5G NR). Thus, access node 310 may be determined as being capable of communicating using both 4G LTE and 5G NR. For example, access node 310 may be configured to transmit control information using the 4G LTE transceiver 313 and data information using the 5G NR transceiver 314. Further, antenna elements 315 may include an array of antenna elements that are configured to deploy a radio air interface over one or more wireless sectors, form beams within these sectors, employ multiple-input-multiple-output (MIMO), etc.

Exemplary instructions stored on memory 312 can include instructions for determining that a first pairing efficiency metric of a first wireless air interface deployed over a wireless sector is higher than a second pairing efficiency metric of a second wireless air interface deployed over the wireless sector, determining that a first channel bandwidth associated with the first wireless air interface is higher than or equal to a second channel bandwidth associated with the second wireless air interface, and offloading wireless devices from the second wireless air interface to the first wireless air interface. Offloading wireless devices from the second wireless air interface to the first wireless air interface comprises triggering handovers of the wireless devices from the second wireless air interface to the first wireless air interface. Triggering handovers comprises adjusting handover thresholds associated carriers using each of the first and second wireless air interfaces. The first wireless air interface comprises a $4^{th}$ generation long-term evolution (4G-LTE) wireless air interface and the second wireless air interface comprises a $5^{th}$ generation new radio (5G-NR) wireless air interface. Thus, in an exemplary embodiment, the first channel bandwidth comprises an aggregate channel bandwidth of two or more carriers configured to utilize the 4G-LTE wireless air interface. Both first and second channel bandwidths can be aggregate, in that the second channel bandwidth also comprises an aggregate channel bandwidth of two or more carriers configured to utilize the 5G-NR wireless air interface. Further, each pairing efficiency metric is respectively based on an eligibility of wireless devices to join or form MU-MIMO groups in each wireless air interface respectively. For example, the eligibility is based on one or more criteria including any combination of: an orthogonality of wireless devices, an angular separation of wireless devices, or a threshold data buffer requirement. In an exemplary embodiment, each pairing efficiency metric comprises a percentage quantity of wireless devices that are eligible to join or form the MU-MIMO groups.

Figure 4:
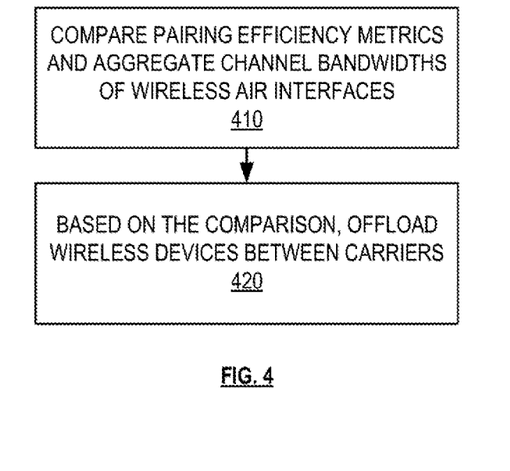
FIG. 4 depicts an exemplary method for load balancing based on pairing efficiency and channel bandwidth.

In another exemplary embodiment, memory 312 can include instructions for comparing pairing efficiency metrics of wireless devices attached to each of the first and second wireless air interfaces, comparing an aggregate channel bandwidth of each of the first one or more carriers and the second one or more carriers, and based on the comparisons of the pairing efficiency metrics and the aggregate channel bandwidth, offloading wireless devices from one carrier to another carrier. The pairing efficiency metrics are based on an eligibility of wireless devices in each of the first or second one or more carriers to join or form MU-MIMO groups. Further, memory 312 can include instructions for determining that a first pairing efficiency metric of wireless devices attached to the first wireless air interface is higher than or equal to a second pairing efficiency metric of wireless devices attached to the second wireless air interface, determining that a first aggregate bandwidth of the first one or more carriers is greater than or equal to a second aggregate bandwidth of the second one or more carriers, and offloading wireless devices from the second wireless air interface to the first wireless air interface. Alternatively or on addition, memory 312 can include instructions for determining that a first pairing efficiency metric of wireless devices attached to the first wireless air interface is higher than a second pairing efficiency metric of wireless devices attached to the second wireless air interface, determining that a first aggregate bandwidth of the first one or more carriers is lower than a second aggregate bandwidth of the second one or more carriers, and avoiding offloading wireless devices from the second wireless air interface to the first wireless air interface. Alternatively or on addition, memory 312 can include instructions for determining that a first pairing efficiency metric of wireless devices attached to the first wireless air interface is lower than a second pairing efficiency metric of wireless devices attached to the second wireless air interface, determining that a first aggregate bandwidth of the first one or more carriers is lower than a second aggregate bandwidth of the second one or more carriers, and avoiding offloading wireless devices from the first wireless air interface to the second wireless air interface FIG. 4 depicts an exemplary method for load balancing based on pairing efficiency and channel bandwidth. The method of FIG. 4 may be implemented by a processing node communicatively coupled to one or more access nodes, controller nodes, or any other network node. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 410, pairing efficiency metrics and aggregate channel bandwidths of at least two different wireless air interfaces are compared, and at 420, wireless devices offloaded between carriers using each wireless air interface based on the comparisons. The carriers may be deployed by a colocated access node, i.e. an access node configured to deploy both 4G and 5G wireless air interfaces. For example, it may be determined that a pairing efficiency metric of one or more carriers using the 4G wireless air interface is higher than a pairing efficiency metric of carriers using the 5G wireless air interface. It may further be determined that a channel bandwidth associated with the 4G wireless air interface is higher than or equal to a channel bandwidth associated with the 5G wireless air interface. Responsive to these determinations, wireless devices may be offloaded from carriers using the 5G wireless air interface to carriers using the 4G wireless air interface. The pairing efficiency metric may be based on performance of MIMO streams using each wireless air interface, such as one or more of a size of each MIMO group comprising the eligible wireless devices, a quantity of eligible wireless devices participating in the MIMO groups, a percentage of total wireless devices attached to the access node, a throughput of each of the one or more MIMO groups in the sector, an average throughput of each MIMO group or each wireless device in each MIMO group, or an aggregate throughput (i.e. total throughput) of all MIMO signals within the sector. Performance metrics and/or pairing efficiency can further be based on historical and/or current information related to a quantity of successful pairings, trends of the signal characteristics, and so on.

Further, the channel bandwidth may be an aggregate channel bandwidth of multiple carriers using each wireless air interface. For example, three 4G carriers having an aggregate channel bandwidth of 60 MHz while a single 5G carrier may have a channel bandwidth of 60 MHZ (or less than 60 MHz). Thus, upon offloading wireless devices to the 4G carrier, the resulting reduction in wireless devices in the 5G carrier frees up air interface resources (such as physical resource blocks) that would otherwise be used by wireless devices that were unable to participate in MIMO. Whereas, the increase in wireless devices in the 4G carrier would not negatively impact the amount of resources in the 4G wireless air interface, because more wireless devices are able to use the same physical resource blocks (due to orthogonality), based on the higher pairing efficiency. Further, the wireless devices attached to the 4G carrier(s) can avail of the higher aggregate channel bandwidth. Further in exemplary embodiments, when the wireless devices are attached to both carriers using dual connectivity, the handover may be seamless, and wireless devices can simply detach from the 5G carrier and begin receiving data transmissions via the 4G carrier.

Figure 5:
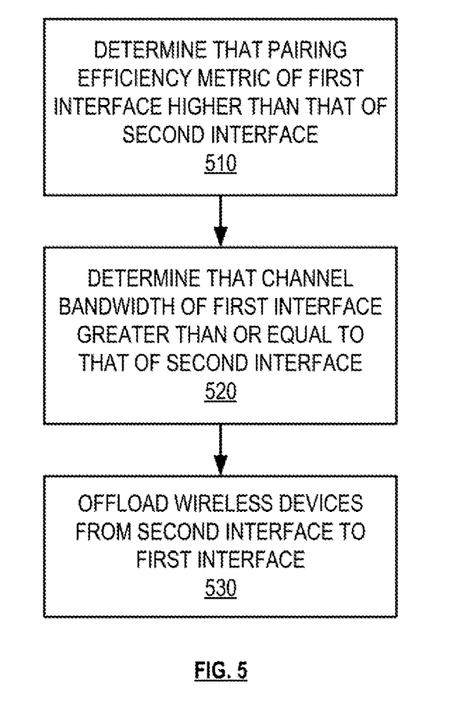
FIG. 5 depicts another exemplary method for load balancing based on pairing efficiency and channel bandwidth.

FIG. 5 depicts an exemplary method for load balancing based on pairing efficiency and channel bandwidth. The method of FIG. 5 may be implemented by a processing node communicatively coupled to one or more access nodes, controller nodes, or any other network node. Although FIG. 5 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 510, a pairing efficiency metric of a first wireless air interface is determined to be higher than a pairing efficiency metric of a second wireless air interface. The pairing efficiency metrics can be based on an eligibility of wireless devices in each of the first or second one or more carriers to join or form MU-MIMO groups. In an exemplary embodiment, the pairing efficiency metric comprises a percentage quantity of wireless devices that are eligible to join or form the MU-MIMO groups. Alternatively or in addition, the pairing efficiency may be based on a ratio of a number of wireless devices qualifying for MIMO versus a total number of wireless devices attached to the access node, and can include current, historical, or predicted trends. In particular, for access nodes capable of deploying different wireless air interfaces (e.g. 4G LTE and 5G NR), the pairing efficiency is determined for each carrier using each wireless air interface.

At 520, it is determined that a channel bandwidth of the first wireless air interface is greater than or equal to a channel bandwidth of the second wireless air interface. The channel bandwidth may be an aggregate channel bandwidth of multiple carriers using each wireless air interface. For example, three 4G carriers having an aggregate channel bandwidth of 60 MHz while a single 5G carrier may have a channel bandwidth of 60 MHZ (or less than 60 MHz). Thus, at 530, wireless devices are offloaded from the second wireless air interface to the first wireless air interface. For example, upon determining that a first pairing efficiency metric of wireless devices attached to the first wireless air interface is higher than or equal to a second pairing efficiency metric of wireless devices attached to the second wireless air interface, and also upon determining that a first aggregate bandwidth of the first one or more carriers is greater than or equal to a second aggregate bandwidth of the second one or more carriers, wireless devices are offloaded from the second wireless air interface to the first wireless air interface. If the pairing efficiency for carriers in one wireless air interface is higher than for carriers using another wireless air interface (based on, for instance, the number of wireless devices qualifying for MU-MIMO pairing in each wireless air interface, or other metrics as identified below), then load balancing is performed between the carriers of each wireless air interface. In particular, handovers are triggered of wireless devices from a wireless air interface having a low pairing efficiency to a wireless air interface having a high pairing efficiency. Offloading wireless devices from the second wireless air interface to the first wireless air interface can include triggering handovers of the wireless devices from the second wireless air interface to the first wireless air interface. For example, triggering handovers can include adjusting handover thresholds associated carriers using each of the first and second wireless air interfaces. Consequently, resources consumption of the wireless air interface having the low pairing efficiency is mitigated, and wireless devices are able to exploit the higher channel bandwidths provided by the wireless air interface that also has the higher pairing efficiency.

Figure 6:
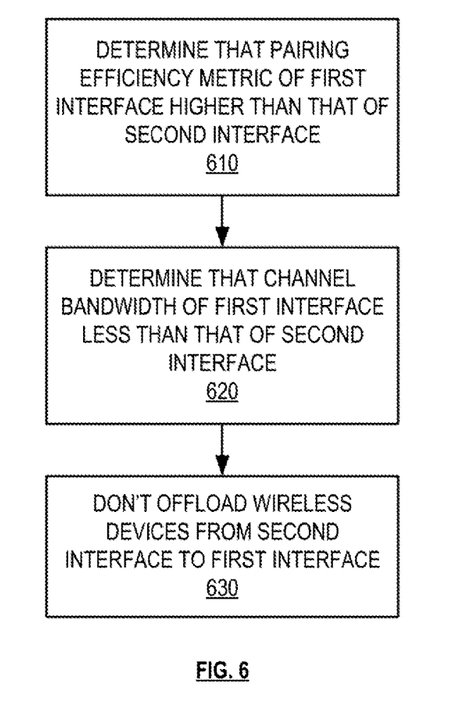
FIG. 6 depicts another exemplary method for load balancing based on pairing efficiency and channel bandwidth.

FIG. 6 depicts an exemplary method for load balancing based on pairing efficiency and channel bandwidth. The method of FIG. 6 may be implemented by a processing node communicatively coupled to one or more access nodes, controller nodes, or any other network node. Although FIG. 6 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 610, a pairing efficiency metric of a first wireless air interface is determined to be higher than a pairing efficiency metric of a second wireless air interface. The pairing efficiency metrics can be based on an eligibility of wireless devices in each of the first or second one or more carriers to join or form MU-MIMO groups. In an exemplary embodiment, the pairing efficiency metric comprises a percentage quantity of wireless devices that are eligible to join or form the MU-MIMO groups. Alternatively or in addition, the pairing efficiency may be based on a ratio of a number of wireless devices qualifying for MIMO versus a total number of wireless devices attached to the access node, and can include current, historical, or predicted trends. In particular, for access nodes capable of deploying different wireless air interfaces (e.g. 4G LTE and 5G NR), the pairing efficiency is determined for each carrier using each wireless air interface.

At 620, it is determined that a channel bandwidth of the first wireless air interface is less than a channel bandwidth of the second wireless air interface. The channel bandwidth may be an aggregate channel bandwidth of multiple carriers using each wireless air interface. For example, three 4G carriers having an aggregate channel bandwidth of 60 MHz while a single 5G carrier may have a channel bandwidth of 100 MHZ. Thus, at 630, no wireless devices are offloaded from the second wireless air interface to the first wireless air interface. This is unlike the embodiment described in FIG. 5, since wireless devices would suffer from the lower channel bandwidths provided by the wireless air interface, despite the pairing efficiency being higher. Similarly, upon determining that a first pairing efficiency metric of wireless devices attached to the first wireless air interface is lower than a second pairing efficiency metric of wireless devices attached to the second wireless air interface, and upon determining that a first aggregate bandwidth of the first one or more carriers is lower than a second aggregate bandwidth of the second one or more carriers, wireless devices may be offloaded from the first wireless air interface to the second wireless air interface.

Figure 7A:
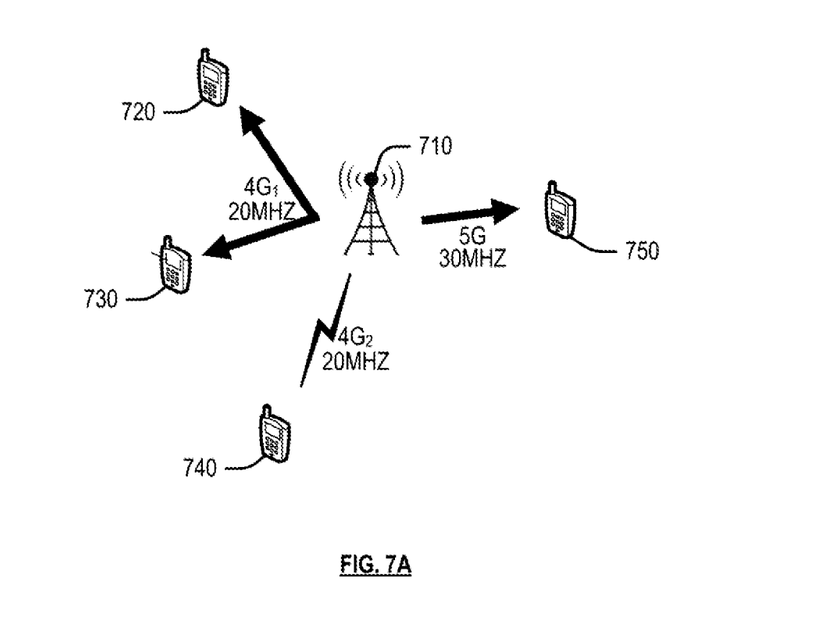
FIGS. 7A-7B depict exemplary configurations of load balancing based on pairing efficiency and channel bandwidth.
Figure 7B:
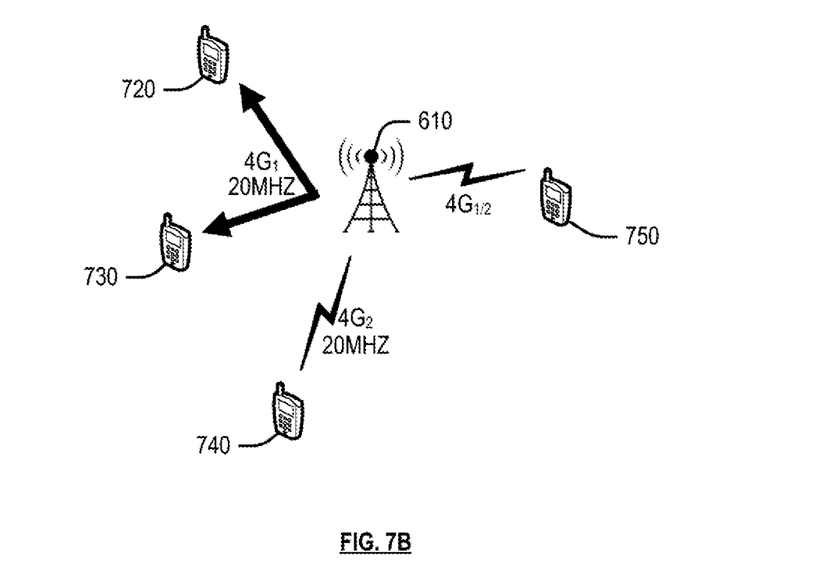

FIGS. 7A-6B depict exemplary load balancing scenarios based on a pairing efficiency of wireless devices in a sector and channel bandwidth. Access node 710 may be configured to deploy carriers using at least two wireless air interfaces, such as a 4G LTE wireless air interface, and a 5G NR wireless air interface. Each wireless air interface may be configured to utilize a different frequency band or sub-band, and carriers deployed therefrom can be configured to utilize a different channel size or channel bandwidth. For example, a 5G NR carrier may be configured to utilize higher frequencies and larger channel bandwidths than a 4G LTE carrier. Further, access node 710 can be configured to deploy any number of carriers using each wireless air interface. Thus, the 4G LTE wireless air interface can include multiple carriers illustrated here as $4G_1$ and $4G_2$, thereby providing a larger aggregate channel bandwidth than a carrier using the 5G NR wireless air interface. As illustrated herein, access node 710 can comprise antennae that are configured to communicate with wireless devices 720 and 730 via the $4G_1$ carrier, with wireless device 740 via the $4G_2$ carrier, and with wireless device 750 via the 5G carrier.

Further, with reference to FIG. 7A, wireless devices 720 and 730 are illustrated as receiving a MU-MIMO data stream using the $4G_1$ carrier, wireless device 740 is illustrated as receiving a standard transmission via the $4G_2$ carrier, and wireless device 750 is illustrated as receiving a SU-MIMO data stream using the 5G carrier. Access node 710 (and/or a processing node communicatively coupled thereto) may be configured to perform operations including comparing pairing efficiency metrics and aggregate channel bandwidths of each of the 4G LTE and 5G NR wireless air interfaces, and based on the comparison, offloading wireless devices between carriers using each wireless air interface. For example, it may be determined that a pairing efficiency metric of the 4G first wireless air interface is higher than a pairing efficiency metric of the 5G wireless air interface (based on, for example, pairing eligibility or other metrics associated with wireless devices 720, 730, and 740). It may further be determined that an aggregate channel bandwidth associated with the 4G wireless air interface is higher than or equal to a channel bandwidth associated with the 5G wireless air interface. For example, the aggregate channel bandwidth of the carriers $4G_1$ and $4G_2$ is 40 MHz, while the channel bandwidth for the 5G carrier is 30 MHz.

Thus, as illustrated in FIG. 7B, wireless device 750 may be offloaded from the 5G wireless air interface to the 4G wireless air interface. The resulting reduction in wireless devices in the 5G carrier frees up air interface resources (such as physical resource blocks) that would otherwise be used by wireless devices that were unable to participate in MIMO. Whereas, the increase in wireless devices in the 4G carriers would not negatively impact the amount of resources in the 4G wireless air interface, because more wireless devices are able to use the same physical resource blocks (due to orthogonality), based on the higher pairing efficiency. Further, the wireless devices attached to the 4G carriers can avail of the higher aggregate channel bandwidth. Further in exemplary embodiments, when the wireless devices are attached to both carriers using dual connectivity, the handover may be seamless, and wireless devices can simply detach from the 5G carrier and begin receiving data transmissions via the 4G carrier.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for load balancing based on pairing efficiency and channel bandwidth, the method comprising:
   determining that a first pairing efficiency metric of a first wireless air interface deployed over a wireless sector is higher than a second pairing efficiency metric of a second wireless air interface deployed over the wireless sector, the first pairing efficiency metric and the second pairing efficiency metric each comprising a respective percentage of wireless devices of a total number of wireless devices eligible to join or form MU-MIMO groups in the respective first and second wireless air interfaces;
   determining that a first channel bandwidth associated with the first wireless air interface is higher than or equal to a second channel bandwidth associated with the second wireless air interface, offloading wireless devices from the second wireless air interface to the first wireless air interface; and
   based on determining that the first pairing efficiency metric is higher than the second pairing efficiency metric and that the first channel bandwidth associated with the first wireless air interface is lower than the second channel bandwidth associated with the second wireless air interface, avoiding offloading wireless devices from the second wireless air interface to the first wireless air interface.

2. The method of claim 1, wherein offloading wireless devices from the second wireless air interface to the first wireless air interface comprises triggering handovers of the wireless devices from the second wireless air interface to the first wireless air interface.

3. The method of claim 2, wherein triggering handovers comprises adjusting handover thresholds associated carriers using each of the first and second wireless air interfaces.

4. The method of claim 1, wherein the first and second wireless air interfaces are deployed by a colocated access node.

5. The method of claim 4, wherein the first wireless air interface comprises a 4th generation long-term evolution (4G-LTE) wireless air interface and the second wireless air interface comprises a 5th generation new radio (5G-NR) wireless air interface.

6. The method of claim 5, wherein the first channel bandwidth comprises an aggregate channel bandwidth of two or more carriers configured to utilize the 4G-LTE wireless air interface.

7. The method of claim 1, wherein the wireless devices are eligible to join or form MU-MIMO groups based on one or more criteria including any combination of: an orthogonality of wireless devices, an angular separation of wireless devices, or a threshold data buffer requirement.

8. A system for load balancing based on pairing efficiency and channel bandwidth, the system comprising:
   an access node configured to deploy a first one or more carriers using a first wireless air interface and a second one or more carriers using a second wireless air interface; and
   a processing node coupled to the access node, the processing node being configured to perform operations comprising:
      comparing a first pairing efficiency metric and a second pairing efficiency metric of wireless devices attached to each of the first and second wireless air interfaces, each pairing efficiency metric comprising a respective percentage of wireless devices of a total number of wireless devices eligible to join or form MU-MIMO groups in the respective first or second one or more carriers;
      comparing a first aggregate channel bandwidth of ach of the first one or more carriers and a second aggregate channel bandwidth of the second one or more carriers; and
      based on determining that the first pairing efficiency metric is higher than or equal to the second pairing efficiency metric and the first aggregate channel bandwidth is greater or equal to the second aggregate channel bandwidth, offloading wireless devices from the first one or more carriers to another the second one or more carriers;
      based on determining that the first pairing efficiency metric is higher than or equal to the second pairing efficiency metric and the first aggregate channel bandwidth is lower than the second aggregate channel bandwidth, avoiding offloading wireless devices from the first one or more carriers to the second one or more carriers.

9. The system of claim 8, wherein the operations further comprise:
   determining that a first pairing efficiency metric of wireless devices attached to the first wireless air interface is lower than a second pairing efficiency metric of wireless devices attached to the second wireless air interface;
   determining that a first aggregate bandwidth of the first one or more carriers is lower than a second aggregate bandwidth of the second one or more carriers; and
   avoiding offloading wireless devices from the first wireless air interface to the second wireless air interface.

10. A processing node for load balancing based on pairing efficiency and channel bandwidth, the processing node being configured to perform operations comprising:
   determining that a first channel bandwidth associated with a first wireless air interface is higher than or equal to a second channel bandwidth associated with a second wireless air interface, wherein both first and second wireless air interfaces are deployed by an access node;
   determining that a first pairing efficiency metric of the first wireless air interface is higher than a second pairing efficiency metric of the second wireless air interface, each pairing efficiency metric comprising a respective percentage of wireless devices of a total number of wireless devices eligible to join or form MU-MIMO groups in the respective first and second wireless air interfaces;
   based on determining that the first pairing efficiency metric is higher than or equal to the second pairing efficiency metric and the first channel bandwidth is greater than or equal to the second channel bandwidth, offloading wireless devices from the first wireless air interface to the second wireless air interface; and
   based on determining that the first pairing efficiency metric is higher than or equal to the second pairing efficiency metric and the first channel bandwidth is lower than the second channel bandwidth, avoiding offloading wireless devices from the first wireless air interface to the second wireless air interface.

11. The processing node of claim 10, wherein offloading wireless devices from the second wireless air interface to the first wireless air interface comprises triggering handovers of the wireless devices from the second wireless air interface to the first wireless air interface.

12. The processing node of claim 11, wherein triggering handovers comprises adjusting handover thresholds associated carriers using each of the first and second wireless air interfaces.

13. The processing node of claim 10, wherein the access node comprises a colocated access node.

14. The processing node of claim 13, wherein the first wireless air interface comprises a 4th generation long-term evolution (4G-LTE) wireless air interface and the second wireless air interface comprises a 5th generation new radio (5G-NR) wireless air interface.

15. The processing node of claim 14, wherein the first channel bandwidth comprises an aggregate channel bandwidth of two or more carriers configured to utilize the 4G-LTE wireless air interface.

* * * * *